United States Patent [19]

Losey et al.

[11] 4,021,635
[45] May 3, 1977

[54] APPARATUS FOR CONTROLLING TOOL FEED MECHANISM ON AN EDM MACHINE

[75] Inventors: Jerry Earl Losey, Fort Thomas, Ky.; John Richard Witzel, Milford; Harry Dean Kauffman, Cincinnati, both of Ohio

[73] Assignee: Cincinnati Milacron, Inc., Cincinnati, Ohio

[22] Filed: Dec. 29, 1975

[21] Appl. No.: 645,256

[52] U.S. Cl. .......................... 219/69 G; 219/69 C; 219/69 P; 235/151.11
[51] Int. Cl.² .......................................... B23P 1/08
[58] Field of Search ............ 219/69 G, 69 M, 69 C, 219/69 P; 235/151.11; 318/650

[56] References Cited

UNITED STATES PATENTS

| | | | |
|---|---|---|---|
| 2,979,639 | 4/1961 | Williams et al. | 219/69 P |
| 3,604,885 | 9/1971 | Inoue | 219/69 P |
| 3,694,599 | 9/1972 | Davis | 219/69 C |
| 3,705,286 | 12/1972 | Koudo et al. | 219/69 G |

*Primary Examiner*—Bruce A. Reynolds

[57] ABSTRACT

An apparatus is disclosed for use with an EDM machine for controlling the motion of the tool relative to a workpiece. In one embodiment, during the ON time, low power pulses are applied across the machining gap immediately prior to machining pulses. A gap voltage signal produced in response to the low power pulses is used exclusively as an input to control the tool feed mechanism. In another embodiment, the gap voltage signal produced by a low power pulse is combined with a gap current signal produced by a machining pulse to generate control signals which are used to produce command signals for the tool feed mechanism. Further, these control signals may be used to drive a meter which provides a visual indication of the general condition of the machining gap.

6 Claims, 6 Drawing Figures

APPARATUS FOR CONTROLLING TOOL FEED MECHANISM ON AN EDM MACHINE

BACKGROUND OF THE INVENTION

The invention relates generally to the area of electro-discharge machining (EDM) apparatus and specifically provides a tool feed mechanism control circuit to control the magnitude of the machining gap in response to the electrical conditions therein.

The prior art discloses various types of tool feed mechanism control circuits. One control circuit measures the ionization voltage across the machining gap during each discharge and uses this measurement to control the feed mechanism. Other systems detect the average discharge voltage as a control variable. Further prior art discloses the detection of discharge current during a machining discharge which is combined with a measurement of the discharge voltage to generate control signals. The control signals may be generated in either analog or digital form to control either analog or digital feed mechanism. Other prior art discloses many additional supplementary control circuits. The most prevalent of these is the detection of the number of actual machining discharges relative to the number of machining pulses applied to the machining gap. As the ratio of discharges to machining pulses decreases, the servomechanism is controlled correspondingly.

Although many of these systems provide an adequate control under normal machining conditions, applicants have devised a tool feed mechanism control circuit which is very sensitive to abnormal conditions in the machining gap. Applicants disclose the use of a low power pulse during the ON time prior to the application of a machining. The low power pulse produces a gap voltage signal which is very sensitive to changes in electrical conditions in the machining gap. Consequently, by using the gap voltage signal produced by a low power pulse as a sensing mechanism, the changes in the machining gap which normally lead to unsatisfactory machining discharges can be detected. Therefore, appropriate changes can be made at an earlier time than if only the variables present during a machining discharge are measured.

SUMMARY OF THE INVENTION

According to one embodiment of the invention, an apparatus is provided for controlling a tool feed mechanism control circuit on an EDM machine. The tool feed mechanism controls the relative motion between an electrically conductive tool and an electrically conductive workpiece positioned in a dielectric medium to form a machining gap therebetween. The machining gap has low power pulses and high power pulses produced thereacross in response to the periodic occurrence of pilot pulses and machining pulses, respectively. The invention provides means responsive to a gap voltage signal produced by the low power pulses for controlling the tool feed as a function of said gap voltage signal. In a second embodiment, a voltage feedback signal is produced when the gap voltage signal during a low power pulse exceeds a predetermined voltage magnitude. This is used in conjunction with a means for producing a current feedback signal in response to a gap current signal produced in response to a machining pulse exceeding a predetermined current magnitude. In this situation, means are provided for producing control signals to the tool feed in response to the combination of said voltage and current feedback signals. In a final embodiment, the above control signals are used to drive a meter thereby providing a visual indication of the quality of conditions in the machining gap.

BRIEF DESCRIPTION OF THE DRAWINGS

FIG. 2 is a detailed block diagram illustrating a second embodiment of the disclosed tool feed mechanism control.

DESCRIPTION TO THE PREFERRED EMBODIMENT

Figure 1:
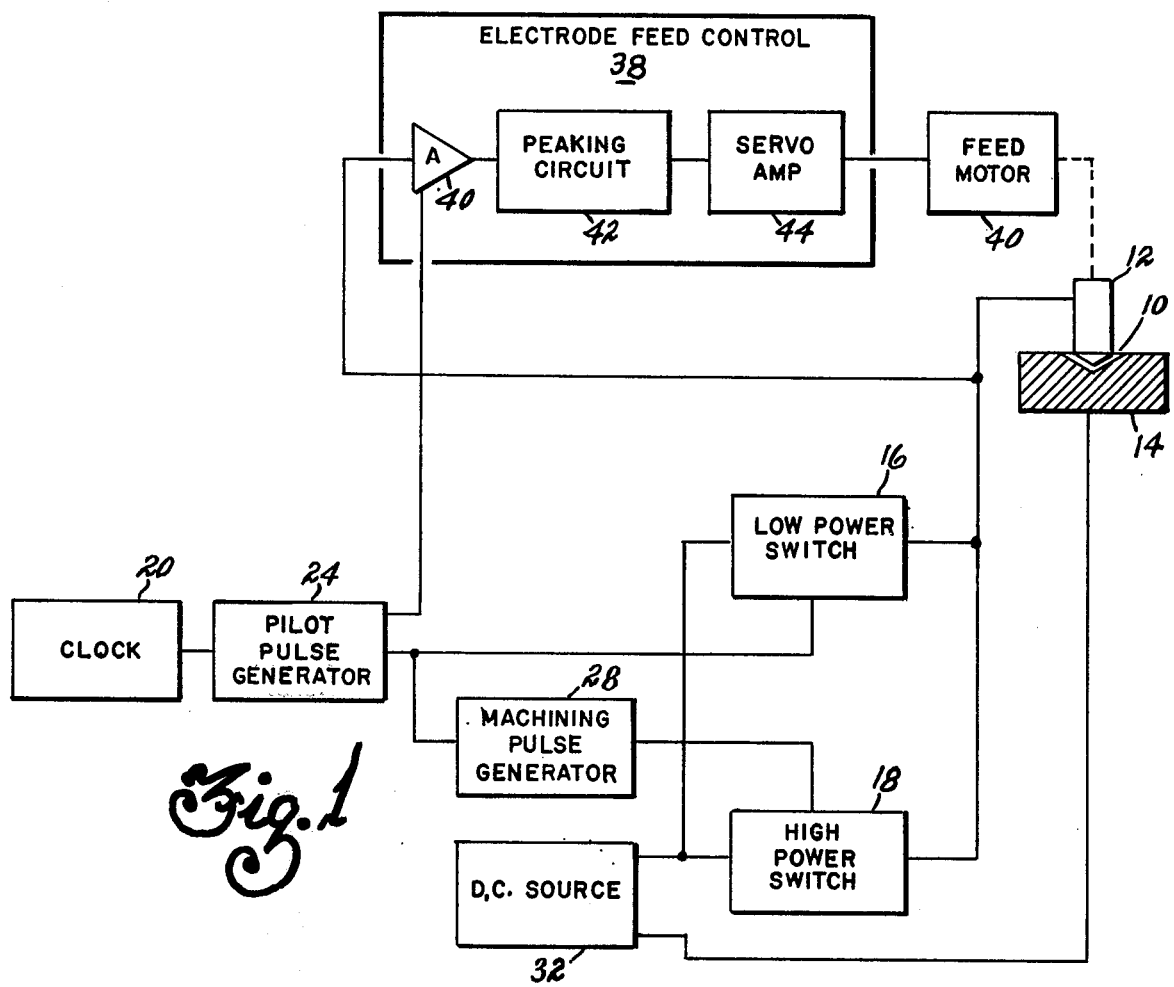
FIG. 1 is a detailed block diagram illustrating one embodiment of the disclosed invention.

FIG. 1 is a detailed block diagram illustrating a first embodiment of the disclosed invention. A machining gap 10 is formed between an electrically conductive tool 12 and an electrically conductive workpiece 14. Electrically connected across the machining gap 10 is a low power switching circuit 16 and a high power switching circuit 18. A clock 20 is operative to produce clock pulses having a predetermined ON times and OFF times. A typical clock signal is shown in the curve 22 of FIG. 5. A pilot pulse generator 24 is responsive to the clock pulses for producing pilot pulses as shown in the curve 26 of FIG. 5. A machining pulse generator 28 is responsive to the pilot pulses for generating machining pulses as indicated by the curve 30 in FIG. 5. A DC source 32 is connected to the inputs of the low power and high power switching circuits 16 and 18. A control input of the low power switch 16 is responsive to the pilot pulses for producing low power pulses across the machining gap 10, thereby normally generating low power discharges. A control input of the high power switching circuit 18 is responsive to the machining pulses for producing high power pulses across the machining gap 10, thereby normally producing high power discharges. An electrode feed control 38 is responsive to a gap voltage signal produced by the low power pulses and produces an output signal to a feed motor 40 for controlling the motion of the tool 12 relative to the workpiece 14 thereby controlling the magnitude of the machining gap 10. Within the electrode feed control 38, an amplifier 40 is responsive to the gap voltage signal produced by the low power pulses and a timing signal from the pilot pulse generator 24. During a sampling period defined by the pilot pulse, the amplifier 40 amplifies the gap voltage signal and provides an input to a peaking circuit 42. The peaking circuit 42 stores the peak values of the amplified gap voltage signal and provides an input signal for a servoamplifier 44. The input stage of the servo-amplifier 44 compares the stored gap voltage signal with a predetermined reference signal and provides an output signal to the feed motor as a function of the relative difference between the reference signal and the stored gap voltage signal.

The circuit in FIG. 1 illustrates an electrode feed control which is responsive to the gap voltage signal produced by the low power pulses. This embodiment has particular application in a fine finish mode of operation. In such a mode of operation, the low power pulses may be used exclusively without the application of machining pulses or they may be used in conjunction with a low energy machining pulse. In either event, the gap voltage signal during the low power pulse will change substantially in response to relatively small changes in the variables affecting the conductivity of the machining gap. Consequently, a very sensitive control of the tool electrode is achieved.

FIG. 2 illustrates a block diagram of a second embodiment of the disclosed invention. As described earlier, a low power switching circuit 16 is responsive to a DC source 32 and pilot pulses generated by a pilot pulse generator (not shown) for producing low power pulses across a machining gap 10. Similarly, a high power switching circuit 18 is responsive to the DC source 32 and machining pulses generated by a machining pulse generator (not shown) for producing high power pulses across machining gap 10. In this case, a gap sensing circuit 46 contains a low power gap voltage detector 48 and a machining pulse current detector 50. The current detector 50 is connected across a resistance 52 which is connected in series with the output stages of the high power switching circuit 18. Within the current detector 50, the zener diode 56 will produce an input signal to the optic coupler 58 in response to a voltage drop across the resistance 52 of a predetermined magnitude. Consequently, the breakdown of the zener diode is proportional to the current flowing through machining gap 10. The optical coupler 58 provides isolation between the electrical signals in the machining gap 10 and the rest of the control circuitry. An amplifier stage 60 is used to convert the output signal from the coupler 58 to a current feedback signal having a magnitude compatible with the logic in the rest of the control system. Therefore, the current detector 50 produces a current feedback signal on the line 66 in response to the discharge current during a machining discharge being equal to or exceeding a predetermined current magnitude.

A low power gap voltage detector 48 is connected across the machining gap and detects the gap voltage signal across the gap during the low power pulses. The voltage detector 48 is similar in its operation to the current detector 50. Therefore, the voltage detector 48 produces a voltage feedback signal on line 64 in response to the gap voltage signal during a low power pulse having a magnitude equal to or exceeding a predetermined magnitude. The voltage and current feedback signals are inputs to a control signal generator 68 which generates control signals to the electrode feed control 70. Within the electrode feed control 70, a command signal generator 72 is responsive to the control signals for generating command signals to a feed motor drive 74 which is operative to control a feed motor 76. consequently, the relative position between the tool 12 and the workpiece 14 is controlled as a function of the voltage and current feedback signals generated in the gap sensing circuit 46. Again, the prior art does not disclose any apparatus in which the tool feed mechanism is controlled as a function of the gap voltage magnitude during an initial low power pulse and the gap current magnitude during a machining pulse.

A further embodiment of the disclosed invention is contained within the gap monitor meter circuit 78. A meter logic circuit 80 is responsive to the control signals for providing input signals to a meter drive circuit 82. The meter 84 responds to the meter drive circuit 82 and provides a visual indication of the quality of discharges occurring across the machining gap. Generally speaking, when the control signals indicate a normal discharge condition, the meter is driven upscale. However, when the control signals indicate abnormal machining conditions, the meter is driven down-scale. Consequently, by observing the meter, the operator may change the dielectric flow rate, the OFF time control or the pulse energy controls to obtain a peak meter reading, thereby optimizing normal gap conditions.

Figure 3A:
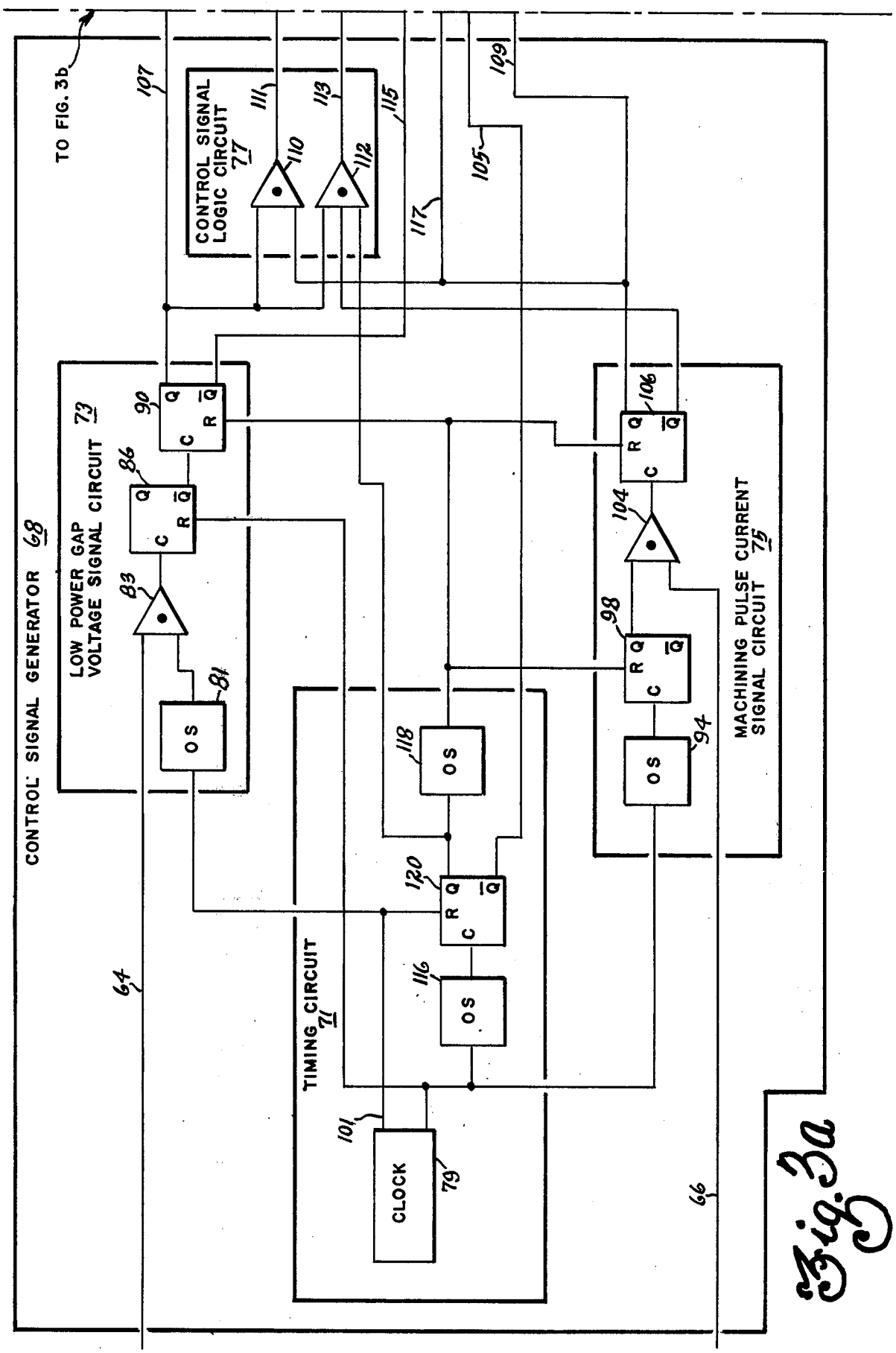
FIGS. 3a and 3b when joined along the indicated junction line illustrate a detailed schematic diagram of the embodiment disclosed in FIG. 2.
Figure 3B:
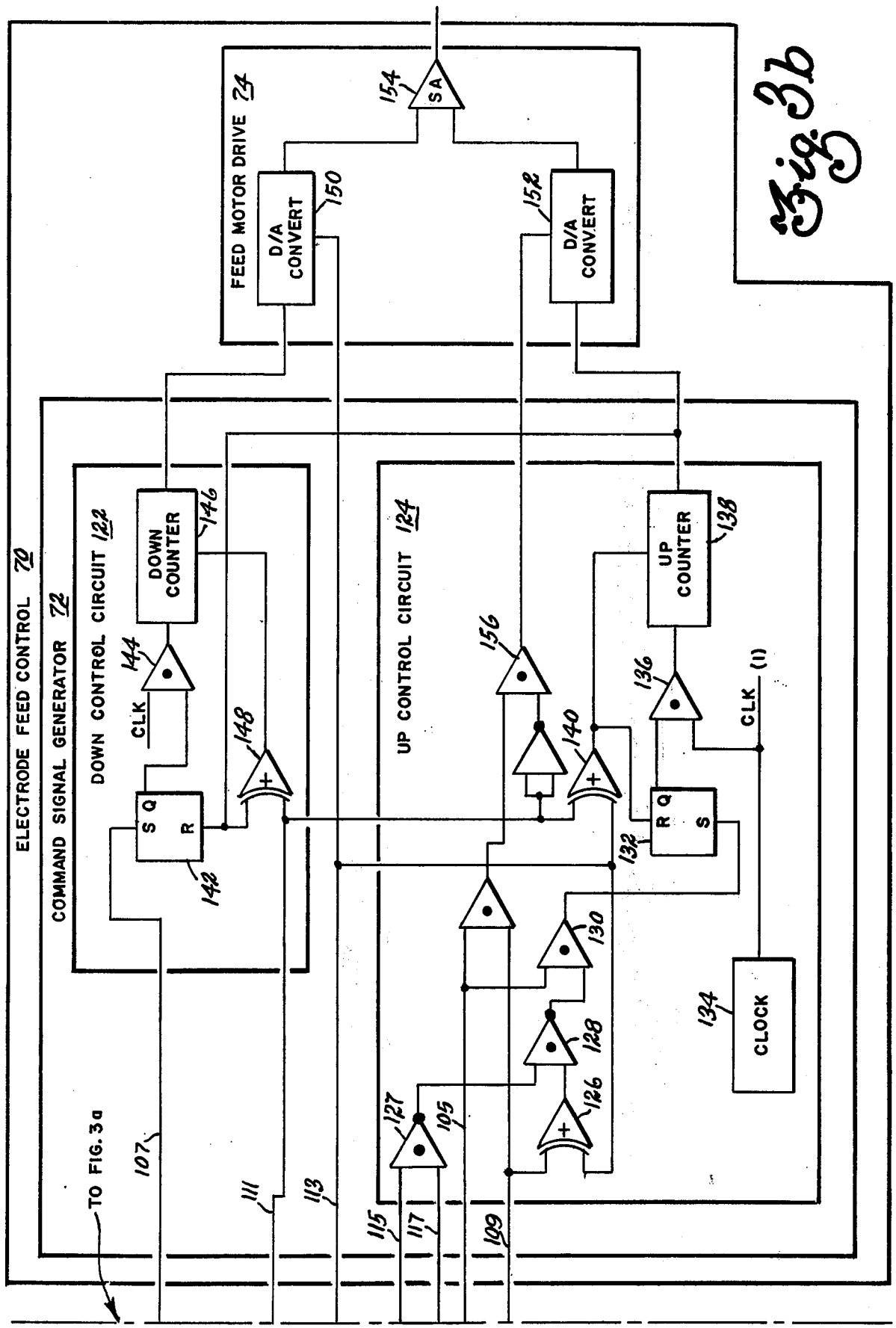

FIGS. 3a and 3b when joined along the indicated junction line, comprise a detailed schematic diagram of the control signal generator and electrode feed control illustrated in FIG. 2. In FIG. 3a the control signal generator 68 is comprised of a timing circuit 71, a low power gap voltage signal circuit 73, a machining pulse current signal circuit 75, and a control signal logic circuit 77. The operation of the control signal generator and electrode feed control is synchronized by a source of clock pulses 79 within the timing circuit 71. For proper synchronization of all signals in the control, the clock 79 may correspond to the pulse generation clock 20 shown in FIG. 1. On the leading edge of the clock, a monostable or one-shot multivibrator 81 produces an output signal to an AND gate 83. On another input to the AND gate 83 is the voltage feedback signal on line 64 generated by the low power gap discharge voltage detector 48. In essence, the one shot 81 provides a window signal for observing the voltage feedback signal. This window may coincide with the time base of the pilot pulse. Consequently, the window may have the same duty cycle as the curve 26 shown in FIG. 5. The generation of a gap voltage signal above a predetermined level will produce a voltage feedback signal from the low power gap voltage detector 48 which is shown in the curve 85 in FIG. 5. On the leading edge of the voltage feedback signal, an output signal will be produced from the AND gate 83 to clock a flip-flop 86. The output signal from the flip-flop 86 is illustrated by the curve 88 shown in FIG. 5. The flip-flop 86 is reset on the trailing edge of the ON time from the clock 79. This in turn causes flip-flop 90 to clock and produce a voltage signal as shown in the curve 92. This voltage signal on line 107 represents a good gap voltage signal during the low power pulse.

Figure 5:
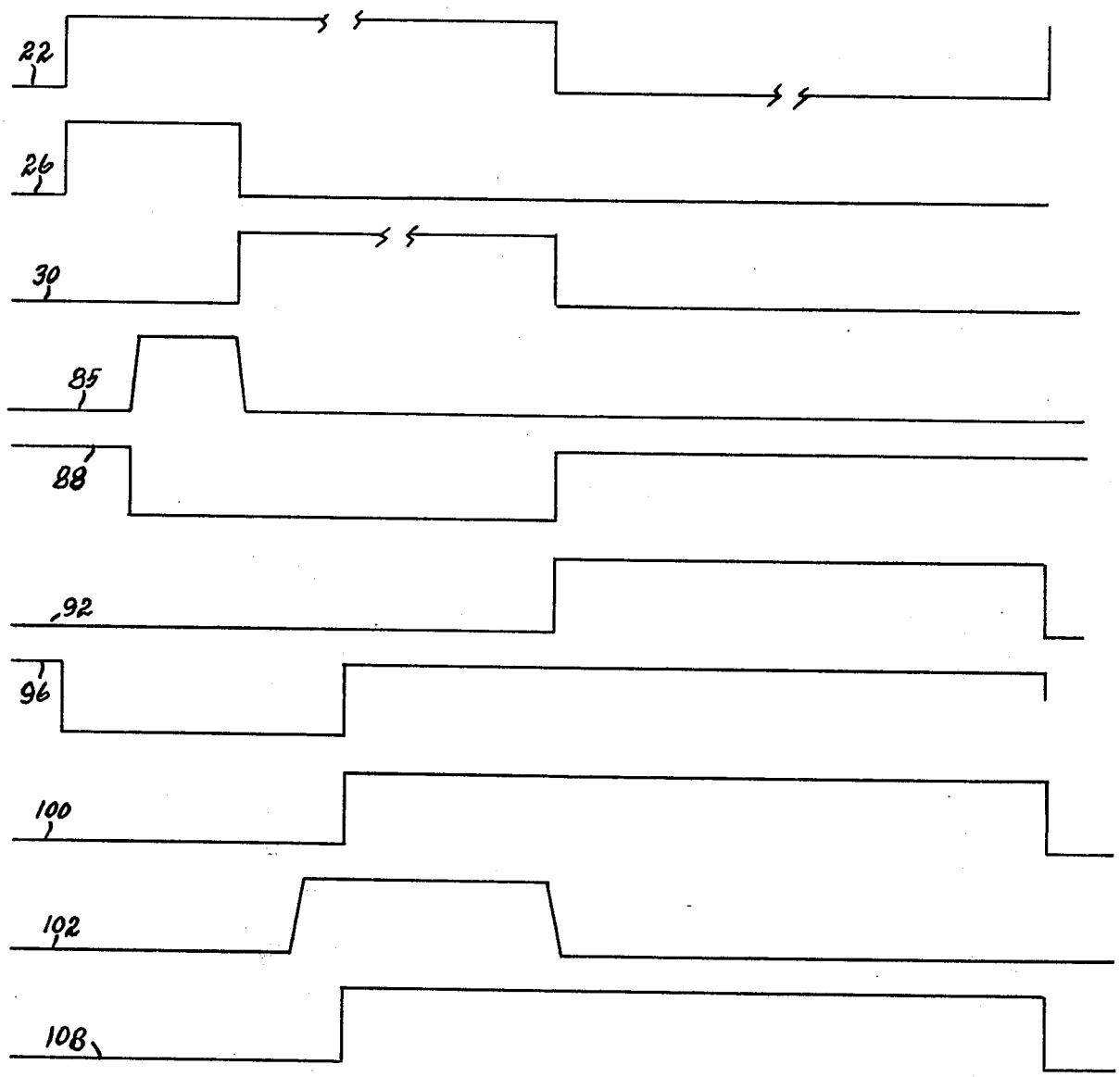
FIG. 5 is a synchrogram illustrating the time relationship of various signals generated by the circuitry shown in FIG. 3.

Within the machining pulse current signal circuit 75, a one-shot multivibrator 94 is responsive to the leading edge of the ON time of the clock 79 for producing a timing signal as shown in the curve 96 in FIG. 5. The time base of the pulse from the one-shot multivibrator 94 is set to be substantially longer than the timing signal generated from the one-shot 81. This is done to guarantee that the trailing edge of the timing signal from the one-shot 94 occurs well into the machining pulse time. With the trailing edge of the timing signal of the one-shot 94, the flip-flop 98 is clocked to produce an output signal therefrom as illustrated in the curve 100 of FIG. 5. The output signal from the flip-flop 98 operates as a timing window to observe a gap current signal during the machining pulse. The gap current signal will appear as indicated by the curve 102 in FIG. 5. If the gap current signal represented by a current feedback signal is present on line 66, upon the clocking of flip-flop 98, the AND gate 104 will produce a clocking signal to the flip-flop 106 which produces an output as illustrated in curve 108 of FIG. 5. The output of flip-flop 106 represents a current signal on line 109 defining a good gap current signal during the machining pulse.

The control signal logic circuit 77 contains a number of gating circuits which are responsive to the voltage and current signals for generating a number of control signals. The AND gate 110 is responsive to the presence of the voltage signal and the current signal for producing a first control signal on line 111 representing a good machining discharge. AND gate 112 is responsive to the voltage signal and the absence of the current signal for producing a second control signal on line 113 representing an open circuit condition. Within the timing circuit 71, the multivibrators 116 and 118 and the flip-flop 120 are used to create further timing signals to initiate reset conditions and further synchronize the operation of the circuit.

In Fig. 3b the electrode feed control 70 is comprised of a command signal generator 72 and a feed motor drive 74. Within the command signal generator, a down control circuit 122 and up control circuit 124 are responsive to the voltage, current and control signals for creating command signals to the feed motor drive to move the tool in the appropriate direction relative to the workpiece. Within the up control circuit 124, an exclusive OR gate 126 is responsive to the current signal or the second control signal to produce an output to NAND gate 128. NAND gate 128 has a second input connected to NAND gate 127 which is responsive to a not voltage signal on line 115 and a current signal on line 117. The output and NAND gate 128 is combined with a timing signal in AND gate 130 to set a flip-flop 132. The output of flip-flop 132 is combined with an oscillator signal from an oscillator 134 in AND gate 136. The output of the AND gate 136 causes an up counter 138 to accumulate counts. The output of the up counter 138 represents a command signal to cause the tool to move away from the workpiece. The up counter 138 will continue its operation until reset by an output from an exclusive OR gate 140 which has as its inputs the first and second control signals. Therefore, in response to a good machining pulse or an open circuit condition, the up counter 138 and flip-flop 132 are reset thereby terminating the feed of the tool away from the workpiece.

Within the down control circuit 122, a flip-flop 142 is responsive to the voltage signal for producing an output to an AND gate 144 having another input connected with the oscillator 134. Consequently, in response to the voltage signal indicating a good low power gap voltage signal, the AND gate 144 produces signals to an input of a down counter 146 accumulating down count pulses. The output of the down counter represents a second command signal to cause the tool to move toward the workpiece. The down counter 146 is cross coupled to the up counter 138 via the exclusive OR gate 148. Therefore, any conditions which cause the up counter 138 to initiate a count will result in the flip-flop 142 and down counter 146 being reset. Further, the first control signal representing a good machining gap condition will also cause the down counter 146 to reset via the gate 148.

Within the feed motor drive circuit 74 is a first digital to analog converter 150, a second digital to analog converter 152 and a servo-amplifier 154. The D/A converter 150 is responsive to the second command signal from the down counter 146. In addition, the converter 150 has an input responsive to the second control signal representing an open machining gap condition. The converter 150 responds to the second control signal by providing a maximum analog output for the duration of the second control signal. The digital to analog converter 152 responds to the digital signal from the up counter 138 to produce an analog output signal to the servo-amplifier 154. In addition, the converter 152 has another input responsive to the AND gate 156. The AND gate 156 is responsive to the current signal and the inverse of the first control signal. Therefore, the output of AND gate 156 generally represents a short circuit condition. In such a situation, the digital to analog converter 152 will produce its maximum analog output for the duration of the output signal from the AND gate 156. Therefore, the servo-amplifier 154 is responsive to the command signals to produce an output signal to the feed motor for driving the tool in the appropriate direction relative to the workpiece.

It should be noted that the particular configuration of the feed motor drive circuit 74 will depend on the type of feed motor employed. For example, if the feed motor is a stepping motor, the servo-amplifier may be replaced by a stepping motor drive circuit. Further, the digital to analog converters may be replaced by AND gates having one input responsive to the command signals and another input responsive to an oscillator having an output frequency compatible with the stepping motor. The above illustrations only represent the most common feed motor drive configurations. Other drive configurations would be readily apparent to those who are skilled in the art.

Figure 4:
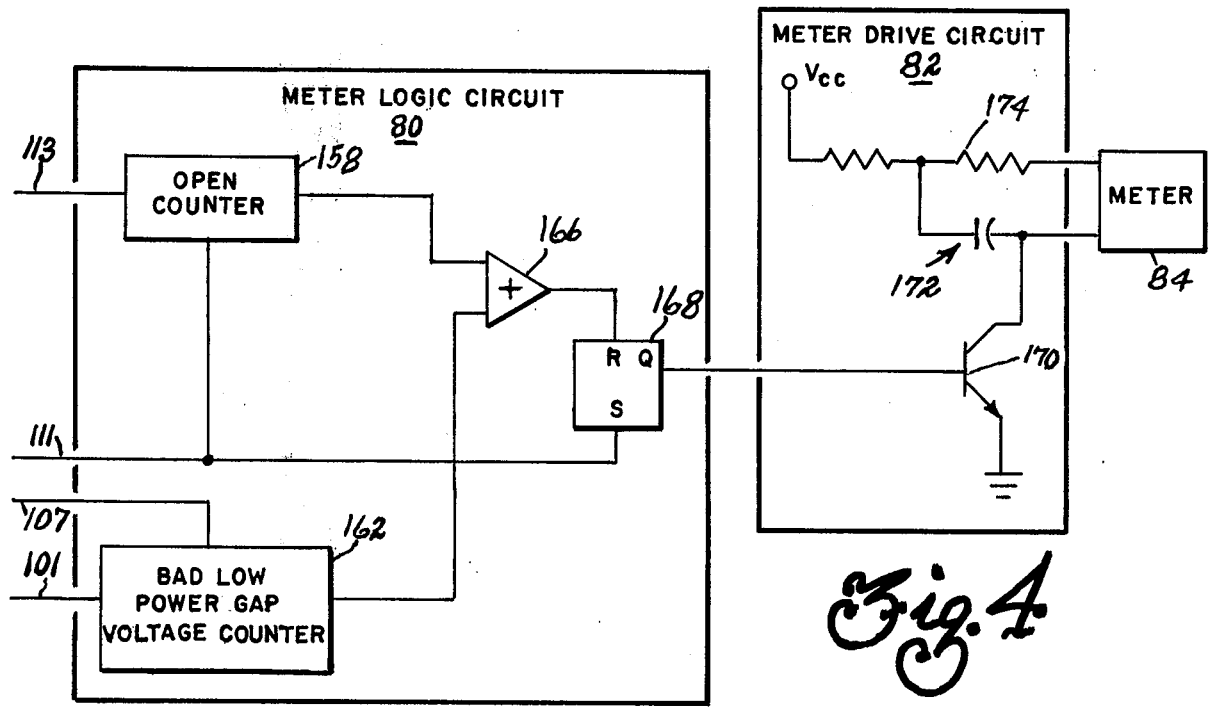
FIG. 4 is a detailed schematic diagram of a third embodiment employing a meter registering the quality of the machining gap.
Figure 6:
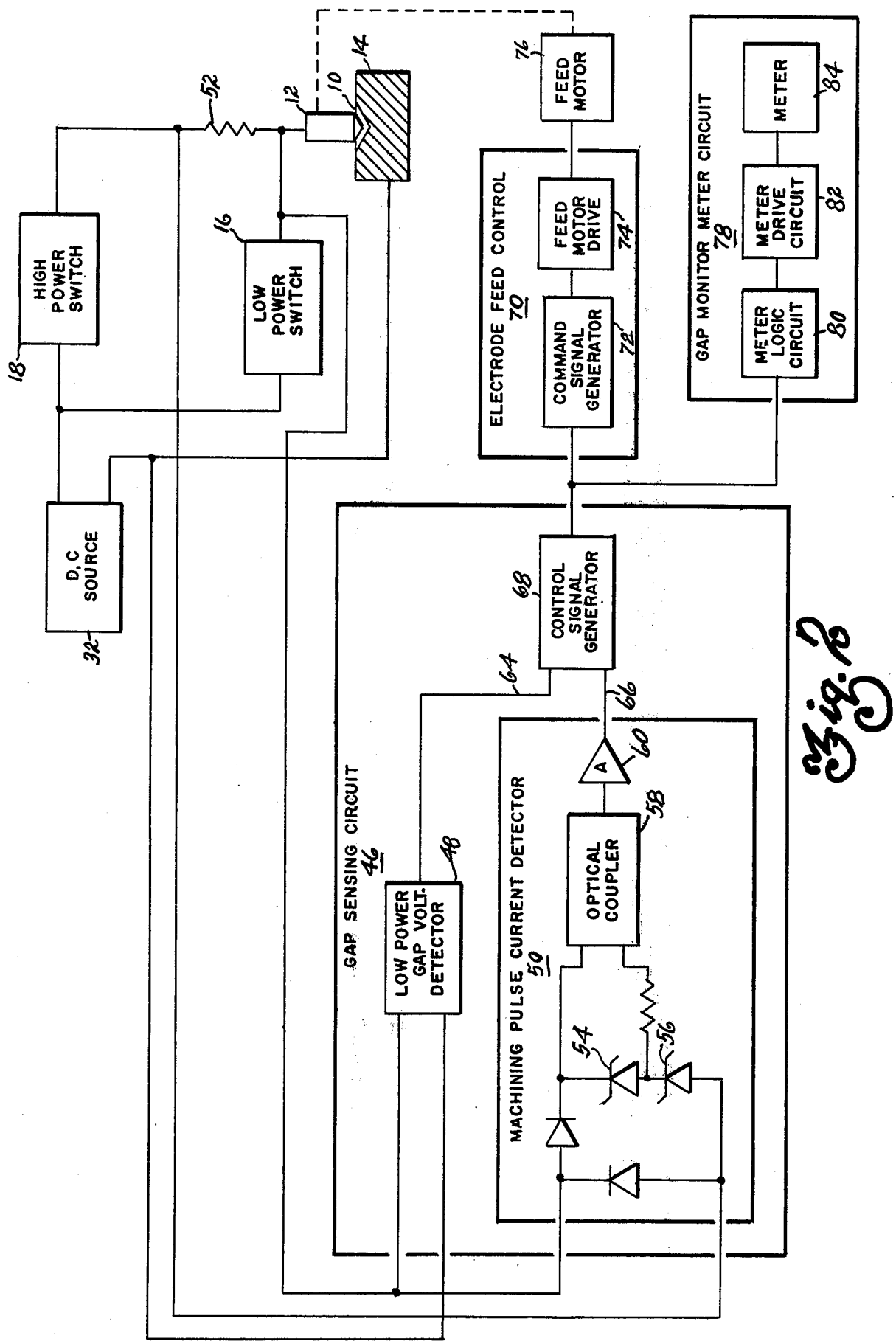

FIG. 4 is a detailed schematic diagram of the gap monitor meter circuit 78 illustrated in general in FIG. 2. The meter logic circuit 80 is responsive to signals generated by the control signal generator 68 shown in FIG. 3a. An open counter 158 is responsive to the second control signal on line 113 for producing an output to one of the inputs of OR gate 166. A bad low power gap voltage counter 162 is responsive to a clock signal on the output line 101 of the clock 79 shown in FIG. 3a. The counter 162 produces an output signal to a second input of OR gate 166. The OR gate 166 responds to a signal on either input to produce an output to a reset input of the flip-flop 168. The flip-flop 168 is set by the first control signal on line 111 representing a good machining pulse. The first control signal is also operative to reset the counter 158 and the counter 162 is reset by a voltage signal on line 107 from the flip-flop 90 shown in FIG. 3a. Therefore, under normal gap conditions, the first control signal is generated and causes the flip-flop 168 to produce an output signal to turn on the transistor 170 within the meter drive circuit 82. This allows a potential to build up on the capacitor 172 thereby providing an input signal to the meter 84. If conditions in the machining gap bacome adverse, the flip-flop 168 is reset; and the transistor 170 is turned off. This terminates the charging action on the capacitor 172 and the capacitor slowly discharges through the resistor 174 and the meter 84 which causes the indicator on the meter 84 to slowly move down scale. Upon viewing this, an operator may change the dielectric flow rate, the OFF time or the pulse energy in the machining pulses to terminate the adverse conditions. If he is successful, the flip-flop 168 will again be set, the transistor 170 will turn on, the capacitor 172 will begin to charge, and the indicator on the meter 84 will move up scale.

While the invention has been illustrated in some detail, according to the preferred embodiments shown in the accompanying drawings, and while the preferred illustrated embodiments have been described in some detail, there is no intention to limit the invention to such detail. On the contrary, it is intended to cover all modifications, alterations and equivalents falling within the spirit and scope of the appended claims.

What is claimed is:

1. An apparatus for controlling a feed mechanism to generate relative motion between an electrically conductive tool and an electrically conductive workpiece, said tool and workpiece being positioned to form a machining gap therebetween, and said machining gap having low power pulses and high power pulses produced thereacross in response to the periodic occurence of pilot pulses and machine pulses, respectively, wherein the improvement comprises:
  a. means responsive to the low power pulses across the machining gap for producing a voltage feedback signal in response to a gap voltage signal produced by each of the low power pulses having a magnitude equal to or exceeding a predetermined voltage magnitude;
  b. means responsive to the high power pulses across the machining gap for producing a current feedback signal in response to a gap current signal produced by each of the high power pulses having a magnitude equal to or exceeding a predetermined current magnitude;
  c. means for generating timing signals synchronized with the occurence of the pilot pulses and the machining pulses;
  d. means responsive to the voltage feedback signal and the timing signals for detecting the occurence of the voltage feedback signal during the occurence of a corresponding pilot pulse and storing a voltage signal as a function thereof;
  e. means responsive to the current feedback signal and the timing signals for detecting the occurrence of the current feedback signal during the occurrence of a corresponding machining pulse and storing a current signal as a function thereof;
  f. means responsive to the voltage signal and the current signal for producing control signals representing conditions in the machining gap as a function of the presence and absence of said current and voltage signals; and
  g. means having inputs responsive to the control signals and outputs connected to the feed mechanism for controlling the feed mechanism as a function of the control signals.

2. The apparatus of claim 1 wherein the means for producing the control signals further comprises:
  a. means responsive to the occurrence of the voltage signal and the current signal for producing a first signal representing a satisfactory condition in the machining gap; and
  b. means responsive to the occurrence of a voltage signal and the absence of a current signal for producing a second signal representing an open circuit condition in the machining gap.

3. The apparatus of claim 2 wherein the apparatus further comprises means responsive to the control signals and the voltage signal for generating a visual indication of conditions in the machining gap.

4. The apparatus of claim 3, wherein the means for generating a visual indication of conditions in the machining gap further comprises:
  a. a meter;
  b. a meter drive circuit; and
  c. means connected to the meter drive circuit and responsive to the first signal for providing an input signal to the meter drive circuit; and
  d. means responsive to the second control signal and the absence of the voltage signal for terminating the input signal to the meter drive circuit.

5. The apparatus of claim 2 wherein the means for controlling the feed mechanism further comprises:
  a. means responsive to the voltage signal and the control signals for producing a first commmand signal for commanding the tool to move toward the workpiece;
  b. means responsive to the current signal and the control signals for producing a second command signal to command the tool to move away from the workpiece; and
  c. means responsive to the command signals and connected to the feed mechanism for producing drive signals corresponding to the command signals to cause the feed mechanism to move the tool in the direction commanded by the command signals.

6. The apparatus of claim 5 wherein the means for producing drive signals further comprises:
  a. means responsive to the command signals for converting the command signals to corresponding analog signals;
  b. servo-amplifier means responsive to the analog signals for producing drive signals to the feed mechanism.

* * * * *